United States Patent Office 3,313,617
Patented Apr. 11, 1967

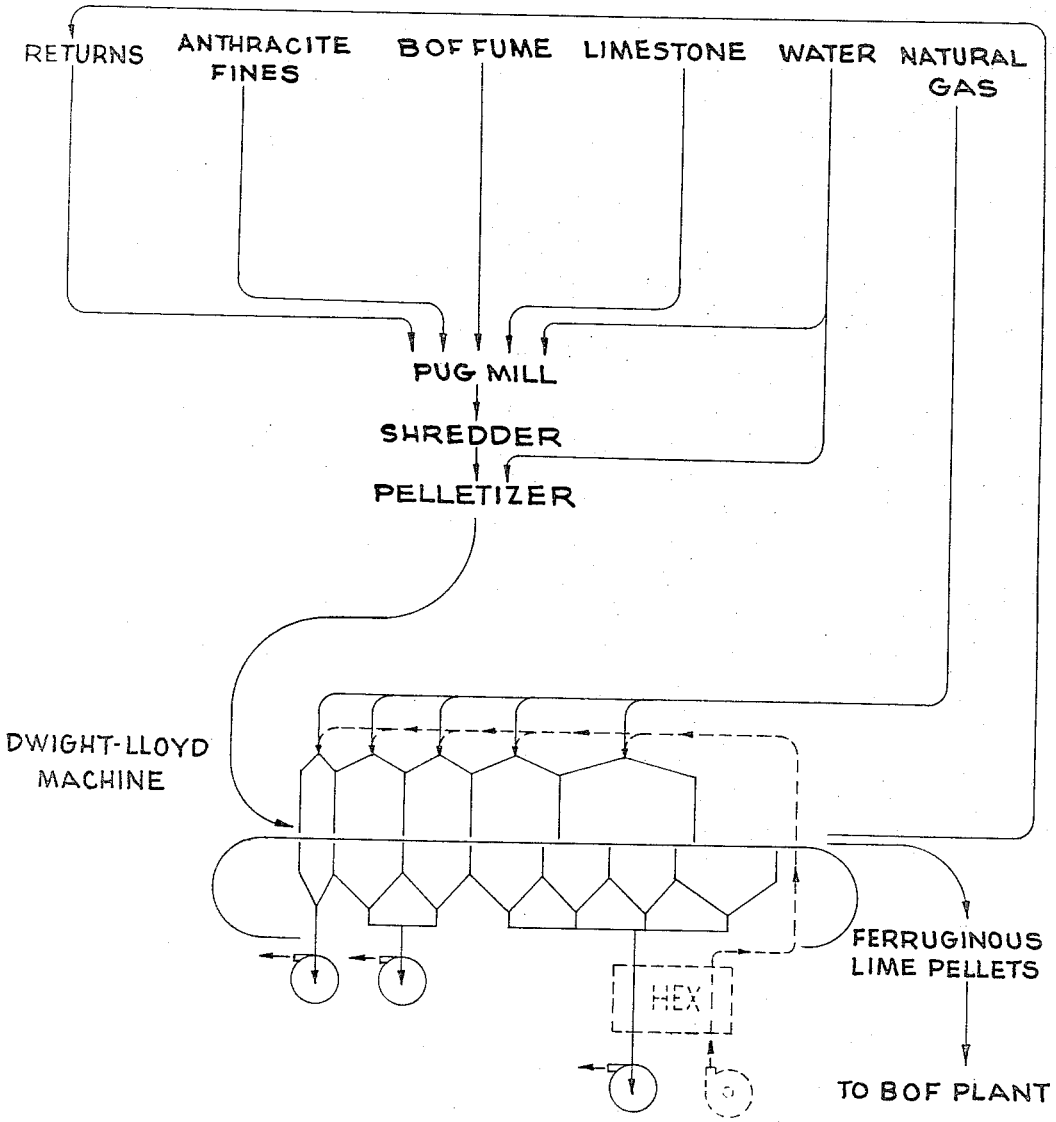

3,313,617
IRON-CONTAINING FLUX MATERIAL FOR
STEEL-MAKING PROCESS
Thomas E. Ban, Cleveland Heights, Charles D. Thompson, South Euclid, and Carl J. Nelson, Lakewood, Ohio, assignors to McDowell-Wellman Engineering Company, a corporation of Ohio
Filed Feb. 6, 1964, Ser. No. 342,892
6 Claims. (Cl. 75—5)

This invention relates, as indicated, to an improved flux material for use in steel-making processes, for example, the basic oxygen furnace, the open hearth, or the like; and more especially to a flux material which contains iron values which have been reclaimed from steel-making processes such as, the open hearth, and the basic oxygen furnace.

More especially, the invention relates to an improved process in which waste materials containing iron values are obtained from steel-making operations and combined with limestone to produce a ferruginous lime material as the final product in a form which is suitable for return to the steel-making operations as a flux material.

In the manufacture of steel, substantial quantities of fume are ordinarily evolved and the principal constituent of such fume is ferric oxide in extremely small particulate form. If such fume is released to the atmosphere, it creates a troublesome atmospheric pollution problem. In order to preclude such pollution problems, it is customary to operate fume abatement devices in connection with steel-making operations.

Conventional fume abatement devices of the type commonly employed in such operations included electrostatic precipitators, dry scrubbers and wet scrubbers. The solid material which is collected in such devices is primarily ferric oxide, $Fe_2O_3$, in the form of small particles which are usually less than 5 microns in diameter and often less than about 1 micron in diameter. While this recovered material is valuable because of its ferric oxide content, it is not possible to recycle it to the steel-making operation because its finely divided form would cause it to be blown out of the apparatus, and this would only overload the fume abatement devices. It is, therefore, desirable to provide a means by which this waste material recovered in a fume abatement system may be converted from a mass of finely divided particles to a form which is suitable for reuse in steel-making operations.

One of the necessary ingredients in the manufacture of steel is a basic oxide, particularly lime, which serves as a flux in removing certain undesirable ingredients from pig iron. Lime forms a slag with materials such as phosphorus and silica which are normally present in pig iron and which must be removed in order to convert the pig iron into steel. In some steel-making processes, such as the open hearth process, it is customary to add limestone to the charge, but it is necessary to convert it to lime before it can serve its function as a fluxing agent. In other processes, such as the so-called basic oxygen process, it is customary to charge the apparatus with lime rather than limestone. It is, therefore, desirable to provide a process in which limestone is converted into lime, and thereafter chemically combine the lime with the waste material containing ferric oxide whereby the waste material is converted to a form suitable for reuse in a steel-making operation, and recovery of the iron values.

It has now been found that by indurating a pelletized admixture of limestone and iron oxide which also includes from about 1.5% to about 10% by weight of a carbonaceous fuel material, such as coke breeze, anthracite coal, bituminous coal, coke, graphite, or the like, there can be produced more efficiently than heretofore possible, a flux material containing lime and calcium ferrites suitable for use as a flux in steel-making processes. The inclusion of the fuel material with the pre-indurated pellets confers several important advantages upon the process of making ferruginous lime fluxing material. It has been found that the capacity of the traveling grate indurating machine may be increased substantially, for example, by up to 1 ton per square foot per day. The presence of the fuel material also aids in the removal of deleterious elements from the iron oxide fume raw material, such as zinc. It has also been found that there is a decrease in the amount of heat required to effect the chemical conversion of the iron oxide to calcium ferrites. Generally, the heat requirements of the fuel containing compositions in comparison with the fuel-less compositions is in the range of from 15% to 30% less.

The present invention may be better understood by having reference to the annexed flow sheet which diagrams the raw materials and the unit operations performed thereon in the production of flux materials by the improved process of the present invention.

Briefly stated, the present invention is in a process for manufacturing an iron-containing flux material for use in steel-making processes. This process comprises forming an intimate mixture of iron oxide, limestone, and carbon, which materials have a median particle size less than about 100 mesh. These relatively finely divided materials are admixed according to a general formula which provides for from about 50% to about 88% of limestone, from about 5% to about 40% of iron oxide, and from about 1.5% to about 10% of carbon, these percentages being by weight on the dry basis. Under certain circumstances, previously prepared indurated product fines or pulverized product may be recycled. For example, fines which are collected from the air streams or gas streams in the process may be recycled and thus, reclaimed. From 1% to 5% by weight of such returned material may be used.

When these particulate materials have been admixed to form the dry mixture, the mixture is moistened with water. Ordinarily, the amount of water will vary from about 7% to about 14% by weight of the dry admixture depending upon the requirements of the mixture under the conditions of pelletizing for the formation of pellets of substantially uniform diameter. The pellets which are formed upon conventional balling or pelletizing apparatus desirably have a particle size in the range of from about .2" to about .5" in diameter. The moist pellets are referred to herein as "green" pellets. The "green"

pellets are charged to a traveling grate machine, for example a conventional Dwight-Lloyd machine, to a depth of from about 6" to about 16" to form a "green" pellet burden.

This burden enters a drying zone in the sintering machine where the pellets are exposed to gases having a temperature of from about 300° F. to about 800° F. Temperatures in excess of this range of temperatures are avoided in order to prevent too rapid removal of water from the pellets which would cause spalling and rupture of the pellets, and undue production of fines. The retention time in this zone ranges from 2 to 10 minutes. After passing through the drying zone, the pellets may enter a preheating zone where the temperature of the pellets is raised to a temperature of up to 2200° F. for a period of from about 6 minutes to about 20 minutes, the temperature increase being effected by passing hot gases through the burden at a rate of from about 175 standard cubic feet per minutes per square foot of grate are (s.c.f.m./sq. ft.) to about 275 s.c.f.m./sq. ft. of grate area.

Following drying and, if practiced, preheating, the pellets are fired or indurated at from 2200° F. up to the point of incipient fusion. Usually, from 2350° F. to 2400° F. is sufficient to effect the chemical conversions. The gas flow rate is about the same as in the preheat zone, i.e. from 175 s.c.f.m./sq. ft. to 275 s.c.f.m./sq. ft., and the retention time in the firing zone is from 5 to 18 minutes.

The product issuing from the discharge end of the traveling grate machine may either be quenched and stored, or transmitted in the hot condition to a basic oxygen furnace plant for use as a fluxing material in the production of steel by the now well known basic oxygen furnace procedure. The processing time of the pelletized compositions of this process is up to one-half of that required for fuel-less composition.

In a more specific embodiment of the invention, such as the one shown in the annexed drawing, before entering the final indurating zone in the traveling grate machine, the "green" pellet burden may be submitted to a preheating zone where the temperature is gradually raised by the passage of gases downwardly through the bed, which gases have a temperature in the range of from 1000° F. to 2200° F. Following firing, the pellet bed may, and desirably does, enter a soaking zone where the temperature of the bed is held at between 2300° F. and 2500° F., preferably between 2350° F. and 2390° F. Gas flow here is slightly higher than in the firing zone by up to 50 s.c.f.m./sq. ft. These conditions are maintained for a period of from about 5 to about 20 minutes to insure completion of the reactions occurring within the bed.

Referring now more particularly to the attached flow sheet, limestone is transferred from a hopper to a grinder where it is reduced in size to the predetermined desired mesh size, preferably such that at least about 50% of the crushed material is able to pass through a 100 mesh screen, otherwise designated as minus 100 mesh. All of the limestone should pass through a 28 mesh screen. From an intermediate storage point, the limestone is directed to a pug mill where it is intimately blended with anthracite coal fines, or other solid carbonaceous material of a particle size range like the limestone, basic oxygen furnace fume, and water. In the preferred process, the mixture then passes through a shredder preliminary to the pelletizing or balling operation. The balls are then transferred to a traveling grate machine, preferably a machine of the Dwight-Lloyd type where they are subjected to controlled conditions of elevated temperature, and the resulting indurated pellets are transferred to storage or may be returned directly to a steel-making operation.

As mentioned above, one method of abating iron oxide containing fumes in a steel-making operation involves a wet scrubbing technique. In such a system, the fumes evolved are passed through a venturi type scrubber to which a liquid such as water is added continuously. Waste materials from most steel-making operations will contain a certain amount of zinc due to the addition of galvanized metal as a part of the scrap charged to the steel-making operation. The wet scrubbing system entraps and retains zinc in the waste material. Zinc is undesirable in a steel-making operation and, if present, it will be volatilized and leave the operation in the fume. Zinc also has a deleterious effect upon the refractory lining of steel-making furnaces. While it is desirable to remove as much of the zinc as possible at the time the fume from the steel-making process is passed through the scrubber, a certain amount of it will pass into the recovered fume particles of iron oxide and be carried into the indurating process. As above indicated, the present process is especially useful in promoting the removal of zinc by reduction to the metal and volatilization in the course of the indurating operation. About 50% to 75% of the zinc may thus be removed. The effluent from a wet scrubbing device may, if desired be passed to a conventional thickener in order to reduce its water content.

While the present invention is in no way limited by the type of fume abatement device utilized in obtaining the particles of ferric oxide which form one of the raw materials of the process, the process will be described hereinafter in relation to the wet sludge obtained from a wet scrubbing system of the type described above merely for the sake of convenience.

Wet sludge of the type obtained in a wet scrubbing system may contain as much as 50% by weight solids after thickening. Such a sludge is liquid and it may be handled by pumping. If desired, the water content of this sludge may be further reduced by conventional means such as filtration or centrifugation to a minimum of about 12% water by weight. It should be emphasized, however, that sludge with a water content as high as 50% makes a suitable feed for the present process. The solid portion of the sludge will usually have a chemical composition within the ranges given in the following table:

TABLE I

| Component: | Percent by weight |
|---|---|
| $Fe_2O_3$ | 60–95 |
| $Mn_2O_3$ | 4–10 |
| $Al_2O_3$ | 1–5 |
| $SiO_2$ | 2–5 |
| CaO | 4–10 |
| MgO | 2–4 |

The dust may also contain minor amounts of phosphorus, sulphur, and zinc. In general, the loss on ignition of the dust will be less than 5%. The average particle size of the solid material will be below about 5 microns in diameter, usually of the order of about 1 micron.

Commercial metallurgical grade limestone having a particle size range of about ¾" to about ¼" makes a suitable raw material for this process. However, before mixing it with the wet sludge, it should be reduced in size so that about ½ will pass through 100 mesh and this size reduction may be conveniently accomplished in a grinder or a pulverizer. 100% of each of the materials used will pass through a 28 mesh screen.

After being reduced in size, the limestone is transferred to a conventional mixing device such as a pug mill where it is mixed with the wet iron oxide sludge described above. Concurrently there is admixed with the mixture a carbonaceous fuel material to the extent of about 1.5% to about 10% by weight on the dry basis. The resulting mixture, calculated on the dry basis, may contain from about 60% to about 90% limestone, from about 6% to about 30% by weight of iron oxide, and from about 1.5% to about 10% by weight of carbon. This mixture is transferred to a conventional balling apparatus in which the moist mixture of limestone, ferric oxide and carbonaceous fuel is formed into so-called "green" pellets which are ordinarily of uniform size and spherical in shape and have an average diameter in the range of from about 0.2" to about 0.5". The "green" pellets are characterized by low resistance to load and they will usually fracture if subjected to a load of about 3 pounds.

One suitable balling apparatus consists of a pan which is open at its upper end and mounted so as to be inclined from the vertical towards its open end. Means are provided to rotate the pan at a relatively fast peripheral speed. Water may be sprayed into the pan at its open end, if desired, to assist in the balling operation. As the pan is rotated, the mixture of limestone, ferric oxide, and carbon will agglomerate into small balls which roll over and over upon the remaining materials so as to gradually increase in size. When the balls or "green" pellets attain sufficient size they will automatically roll out of the open end of the pan. These so-called "green" pellets or moist unheated pellets are collected and conveyed to a conventional traveling grate machine.

Traveling grate machines of the Dwight-Lloyd type are widely employed in the metallurgical art and the principles of their operation are well understood. In general, such machines comprise a grate made up of a plurality of individual pallets or grates. This traveling grate is power driven and when operated in a pellet indurating device, passes continuously through an enclosed chamber which is equipped with gas confining hoods, generally located above the grate, and gas exhausting means, such as one or more windboxes coacting with fan means to insure the flow of gas through the enclosed chamber. Means, such as a plurality of gas burners, are provided for supplying heat to ignite the burden on the grates as it passes through the initial chambers. The traveling grate machine may also include heat conservation means for recovering heat from the exhaust gases, e.g. to preheat incoming air in the firing zones, and bed preheating zones. In operation, the charge to the traveling grate machine is distributed evenly on the grates to a depth of from about 6" to about 16", preferably about 12" to 15". The indurated pellet material emerging from the machine will fall from the pallets as discrete pellets as the pallets begin their return trip to the entrance of the machine.

In the traveling grate machine, the "green" pellets are first slowly dried by gradually, raising their temperature within the range of about 300° F. to about 800° F. in a time not less than about 2 minutes to 10 minutes. If the temperature is raised more rapidly, the water vapor within the pellets will evolve so violently as to cause the disintegration of the pellets. During the next step in the heating cycle, the temperature is raised to a bed temperature in the range of from about 1000° F. to about 2200° F. Once again, the temperature must not be raised too rapidly because the evolution of carbon dioxide during this phase of the process, and at least about 6 minutes to 20 minutes should be allowed for this step. As the final step in the heating cycle, the bed temperature is raised to above about 2200° F., but not higher than the point of incipient fusion of the pellets, i.e. soft, but not molten. The firing period ranges from about 5 to about 18 minutes. It is usually unnecessary to go much above 2400° F. and this temperature need only be maintained during a soaking period of 5 minutes to 20 minutes. Soaking may be found desirable to complete the chemical reactions within the bed and thereafter the bed allowed to cool by drawing ambient air through the bed in either upward or downward direction.

The pellets which are the product of these machines and this process are transformed from a simple mixture of iron oxide, carbon and limestone into an intimately bonded homogeneous mixture of lime and calcium ferrites. The indurated pellets are characterized by their high resistance to crushing and, in general, they are capable of withstanding crushing loads in excess of 45 pounds as measured in a hydraulic press.

It is postulated that the following chemical reactions may occur in the traveling grate machine:

$$CaCO_3 \rightarrow CaO + CO_2$$
$$2CaO + Fe_2O_3 \rightarrow 2CaO \cdot Fe_2O_3$$
$$CaO + Fe_2O_3 \rightarrow CaO \cdot Fe_2O_3$$
$$4CaO + FeO + 4Fe_2O_3 \rightarrow 4CaO \cdot FeO \cdot 4Fe_2O_3$$
$$CaO + FeO + Fe_2O_3 \rightarrow CaO \cdot FeO \cdot Fe_2O_3$$
$$CaO + 2Fe_2O_3 \rightarrow CaO \cdot 2Fe_2O_3$$
$$3CaO + FeO + 7Fe_2O_3 \rightarrow 3CaO \cdot FeO \cdot 7Fe_2O_3$$
$$CaO + 3FeO + Fe_2O_3 \rightarrow CaO \cdot 3FeO \cdot Fe_2O_3$$

It will be appreciated that the exact reactions which occur within the traveling grate machine cannot be established with certainty, and, accordingly, the reactions are to be considered merely as illustrative and not as limiting this invention in any manner Heat for the drying operation may be supplied in whole, or in part with additional heat added by gas torch, from air which has been passed in heat exchange relation with exhaust gases issuing from intermediate higher temperature zones. In the pre-heating and firing zones a natural gas may be burned in an air stream to provide gases of the requisite temperature to ignite the fuel and promote its burning to impart the still higher temperatures to the bed necessary to promote and sustain the chemical reactions occurring therein. The temperature within the bed, or "bed temperature," may be regulated by throttling the air velocity, regulating the preheated air volume admixed with ambient air, or by regulation of the amount of fuel in the pellets. The temperatures of the bed are approximate and may be measured by thermocouples extending into the moving bed and fixed with relation to the machine, i.e. with the bed moving past the thermocouple.

It becomes convenient at this point to illustrate the foregoing process by giving specific examples setting forth the compositions of the green mix, and the conditions of pelletizing and conversion of the "green" pellets to a flux material useful in a steel-making process as above described.

SUMMARY OF CHARGE AND PRODUCT DATA
[Basic fume and limestone blends with additions of solid fuel]

| Test Number | 1 | 2 |
|---|---|---|
| Green Mix Composition (Dry Basis): | | |
| Fume (Basic Oxygen Process), percent | 8.10 | 24.39 |
| Limestone, percent | 87.14 | 73.17 |
| Anthracite Fines, percent | 4.76 | 2.44 |
| Charge Data—Green Pellets: | | |
| Charge Weight—Wet, pounds | 75.0 | 75.0 |
| Bed Depth, in | 10 | 10 |
| Green Pellet Properties: | | |
| Moisture Content, percent | 10.5 | 8.6 |
| Crush Strength—Dry, pounds | 6.3 | 4.9 |
| Pellet Size, in | −½, ⅜ | −½, ⅜ |
| Total Pelletizing Time, Min. | | |
| Drying | 2 | 8 |
| Preheating | 13 | 9 |
| Firing | 8 | 15 |
| Soaking and Cooling | 5 | 7 |
| Total | 28 | 37 |
| Product Data: | | |
| Total Discharge: | | |
| Pounds | 39.1 | 45.0 |
| ½ percent | 12.23 | 10.98 |
| ⅜ percent | 43.77 | 76.96 |
| Product Structure: | | |
| ¼ percent | 43.28 | 3.07 |
| ⅛ percent | 0.26 | 2.82 |
| −⅛ percent | 0.46 | 6.18 |
| ⅜" Product Recovery, percent | 99.5 | 93.8 |
| Crush Strength (−½, ⅜"), lbs | 178 | 50 |
| Chemistry—Residual LOI, percent | 0.25 | 0.65 |

SUMMARY OF PELLETIZING CONDITIONS

[Basic fume and limestone blends with additions of solid fuel]

| Test Number | 1 | 2 |
|---|---|---|
| Drying I: | | |
| Temperature, °F | 600 | 400 |
| Draft Flow Rate, SCFM/ft.² | 250 | 250 |
| Vacuum, in. of H₂O | 1.4 | 1.6 |
| Time, min | 2 | 4 |
| Drying II: | | |
| Temperature, °F | | 600 |
| Draft Flow Rate, SCFM/ft.² | | 200 |
| Vacuum, in. of H₂O | | 2.0 |
| Time, min | | 2 |
| Preheating I: | | |
| Temperature, °F | 1,000 | 1,000 |
| Draft Flow Rate, SCFM/ft.² | 200 | 200 |
| Vacuum, in. of H₂O | 1.4 | 3.3 |
| Time, min | 4 | 4 |
| Preheating II: | | |
| Temperature, °F | 1,600 | 1,600 |
| Draft Flow Rate, SCFM/ft.² | 200 | 200 |
| Vacuum, in. of H₂O | 2.0 | 6.0 |
| Time, min | 4 | 5 |
| Preheating III: | | |
| Temperature, °F | 2,200 | |
| Draft Flow Rate, SCFM/ft.² | 200 | |
| Vacuum, in. of H₂O | 3.4 | |
| Time, min | 5 | |
| Firing: | | |
| Temperature, °F | 2,350 | 2,200 |
| Draft Flow Rate, SCFM/ft.² | 200 | 200 |
| Vacuum, in. of H₂O | 4.0 | 11.7 |
| Time, min | 8 | 15 |
| Soaking and Cooling: | | |
| Draft Flow Rate, SCFM/ft.² | 300 | 300 |
| Vacuum, in. of H₂O | 4.3 | 8.6 |
| Time, min | 5 | 7 |
| Total Processing Time, min | 28 | 37 |

The product of the traveling grate machine will have a size range which is somewhat smaller than that of the charge due to the weight loss during the indurating operations. These pellets are suitable for use as an iron bearing flux in steelmaking operations and they may be charged to a steel-making furnace. The need for lime which is inherent in any steel-making operation will be reduced by the amount of lime in the pellets and, moreover, the iron value of the dust collected in fume abatement devices may be recovered as steel.

It will be apparent from the foregoing description and examples that the process of the present invention makes it possible to recover more economically and efficiently the iron values from the material collected in fume abatement devices. The process is also an improvement over prior ferruginous lime processes in that the capacity of the traveling grate machine apparatus, the zinc removal feature, and the reduced heat requirements provide a better and more economical fluxing material.

Other modes of applying the principle of this invention may be empoyed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for making an iron-containing flux material for steel-making processes comprising the steps of:
    (a) intimately mixing dry materials having a particle size finer than about 28 mesh to form a dry mixture having the following general formulation:
        (1) limestone—from about 60% to about 90%,
        (2) iron oxide—from about 6% to about 30%,
        (3) carbon—from about 1.5% to about 10%,
    (b) moistening said dry mixture with water,
    (c) pelletizing said moistened mixture to form substantially uniform green discrete pellets having a particle size in the range of from about 0.2" to about 0.5",
    (d) charging said green pellets to a traveling grate indurating machine to a depth of from 6" to 16" to form a green pellet burden,
    (e) drying said green pellets at a temperature of from about 300° F. to about 800° F., and
    (f) indurating said pellets at a bed temperature of at least about 2200° F. for a period of from about 5 to about 18 minutes by passing air through said pellet burden at a rate of from about 175 s.c.f.m./sq. ft. to about 275 s.c.f.m./sq. ft.

2. A process for making an iron-containing flux material for steel-making processes comprising the steps of:
    (a) intimately mixing dry materials having a particle size finer than about 28 mesh to form a dry mixture having the following general formulation:
        (1) limestone—from about 60% to about 90%,
        (2) iron oxide—from about 6% to about 30%,
        (3) carbon—from about 1.5% to about 10%,
    (b) moistening said dry mixture with water,
    (c) pelletizing said moistened mixture to form substantially uniform green discrete pellets having a particle size in the range of from about 0.2" to about 0.5",
    (d) charging said green pellets to a traveling grate indurating machine to a depth of from 6" to 16" to form a green pellet burden,
    (e) drying said green pellets at a temperature of from about 300° F. to about 800° F.,
    (f) pre-heating said pellets to a bed temperature of up to 2200° F. in a period of from 6 to 20 minutes by passing air through said pellet burden at a rate of from about 175 s.c.f.m./sq. ft. to about 275 s.c.f.m./sq. ft., and
    (g) indurating said pellets at a bed temperature of at least about 2200° F. for a period of from about 5 to about 18 minutes by passing air through said pellet burden at a rate of from about 175 s.c.f.m./sq. ft. to about 275 s.c.f.m./sq. ft.

3. A process for making an iron-containing flux material for steel-making processes comprising the steps of:
    (a) intimately mixing dry materials having a particle size finer than about 28 mesh to form a dry mixture having the following general formulation:
        (1) limestone—from about 60% to about 90%,
        (2) iron oxide—from about 6% to about 30%,
        (3) carbon—from about 1.5% to about 10%,
    (b) moistening said dry mixture with water,
    (c) pelletizing said moistened mixture to form substantially uniform green discrete pellets having a particle size in the range of from about 0.2" to about 0.5",
    (d) charging said green pellets to a traveling grate indurating machine to a depth of from 6" to 16" to form a green pellet burden,
    (e) drying said green pellets at a temperature of from about 300° F. to about 800° F.,
    (f) pre-heating said pellets to a bed temperature of up to 2200° F. in a period of from 6 to 20 minutes by passing air through said pellet burden at a rate of from about 175 s.c.f.m./sq. ft to about 275 s.c.f.m./sq. ft.,
    (g) indurating said pellets at a bed temperature of at least about 2200° F. for a period of from about 5 to about 18 minutes by passing air through said pellet burden at a rate of from about 175 s.c.f.m./sq. ft. to about 275 s.c.f.m./sq. ft., and
    (h) soaking said pellets at a bed temperature of from 2300° F. to 2500° F. for a period of from about 5 to 20 minutes by passing air through said pellet burden at a rate of from 200 s.c.f.m./sq. ft. to about 300 s.c.f.m./sq. ft.

4. The process of claim 1 in which the iron oxide is ferric oxide derived from a steel-making operation.

5. The process of claim 2 in which the ferric oxide is derived from a basic oxygen furnace.

6. A process for making an iron-containing flux material for steel-making processes comprising the steps of:
    (a) intimately mixing dry materials having a particle size finer than about 28 mesh to form a dry mixture having the following general formulation:
  (1) limestone—from about 50% to about 85%,
  (2) iron oxide—from about 10% to about 48%,
  (3) carbon—from about 1.5% to about 10%,
  (4) recycled indurated flux material—from about 1% to about 5% by weight,
(b) moistening said dry mixture with water,
(c) pelletizing said moistened mixture to form substantially uniform green discrete pellets having a particle size in hte range of from about 0.2″ to about 0.5″,
(d) charging said green pellets to a travelling grate indurating machine to a depth of from 6″ to 16″ to form a green pellet burden,
(e) drying said green pellets at a temperature of from about 300° F. to about 800° F., and
(f) indurating said pellets at a temperature of at least about 2200° F. for a period of from about 5 to about 20 minutes by passing hot gases through said pellet burden at a rate of from about 175 s.c.f.m./sq. ft. to about 275 s.c.f.m./sq. ft.

References Cited by the Examiner

UNITED STATES PATENTS

| | | | |
|---|---|---|---|
| 765,789 | 7/1904 | Peppel | 75—3 |
| 1,267,686 | 5/1918 | Newberry | 75—55 |
| 2,159,977 | 5/1939 | Nicholas | 75—54 |
| 2,750,273 | 6/1956 | Lellep | 75—3 |
| 2,990,268 | 6/1961 | DeVaney | 75—5 |
| 3,083,090 | 3/1963 | Davies | 75—5 |
| 3,180,723 | 4/1965 | McCauley | 75—3 |

BENJAMIN HENKIN, *Primary Examiner.*